United States Patent [19]

Smith

[11] Patent Number: 5,518,361

[45] Date of Patent: May 21, 1996

[54] METHOD AND APPARATUS FOR THE HIGH-SPEED HANDLING OF COMPACT DISC STORAGE CONTAINERS WITH MINIMAL PRODUCT MARKING OR DAMAGE

[75] Inventor: Ruslon J. Smith, Moscow, Pa.

[73] Assignee: Equipment Technology, Inc., Peckville, Pa.

[21] Appl. No.: 358,919

[22] Filed: Dec. 19, 1994

[51] Int. Cl.⁶ .................................................. B65G 57/30
[52] U.S. Cl. ........................................ 414/795.3; 414/786
[58] Field of Search .............................. 414/795.3, 786, 414/795.2

[56] References Cited

U.S. PATENT DOCUMENTS 2,603,363 7/1952 Bongiovanni .................. 414/795.3

FOREIGN PATENT DOCUMENTS

| 2319156 | 11/1973 | Germany | 414/795.3 |
| 614669 | 1/1961 | Italy | 414/795.3 |
| 297047 | 12/1986 | Japan | 414/795.3 |

Primary Examiner—William E. Terrell
Assistant Examiner—Janice L. Krizek
Attorney, Agent, or Firm—Jones & Askew

[57] ABSTRACT

An apparatus for stacking cases for compact discs or other storage medium. The apparatus includes the use of specially-timed support elements which upwardly index a compact disc container into the bottom of a stack of like items. Improved handling features provide for resistance to scratching or other damage.

9 Claims, 7 Drawing Sheets

5,518,361

METHOD AND APPARATUS FOR THE HIGH-SPEED HANDLING OF COMPACT DISC STORAGE CONTAINERS WITH MINIMAL PRODUCT MARKING OR DAMAGE

TECHNICAL FIELD

This invention relates in general to the handling of substantially planar items, and particularly relates to the high-speed handling of compact disc storage containers with a minimum of undesirable marking or damage caused by case-to-case contact or case-to-apparatus contact.

BACKGROUND OF THE INVENTION

In the prior art, it is known to provide data mediums such as compact discs (otherwise known as CDs) within protective storage containers for sale to the public. As such discs have recently found widespread acceptance in the digital storage of sound, photographic, videographic, and other data for ROM-type storage, the volume of such discs being manufactured and distributed has become significantly high to create the need for high speed handling of discs and their storage cases, some of which have been referred to as "jewel boxes", although other case types are known.

However, as is well known, the CD cases often include smooth-sided major side surfaces which are often transparent and cover identifying indicia or artwork. Should these side surfaces (or any other outside surface) become scratched or otherwise damaged, the appearance of the product is affected to the disadvantage to the seller. Therefore, a need has been recognized in the industry for a method and apparatus for handling such cases at high production rates with a minimum of damage thereto.

SUMMARY OF THE INVENTION

The present invention overcomes inadequacies in the prior art by providing a method and apparatus for handling compact disc storage cases at high production rates with a minimum of damage thereto.

Generally described, the present invention relates to a method and apparatus for stacking substantially flat compact disc cases each including substantially parallel upper and lower major planar surfaces, a substantially uniform thickness and a periphery, said apparatus comprising a conveyor means defining a supporting surface for transferring cases placed thereon in a first direction from a first position to a second position, said lower surfaces of said cases in said first and second positions being substantially coplanar, case vertical indexing means for moving said cases from said second position to a third position in a second direction, said second direction being substantially perpendicular to said first direction, and subsequently from said third position to a fourth position in a third direction, said third direction being substantially opposite to said second direction, and retractable shelf means being movable from a retracted position to a case supporting position, said retractable shelf means synchronized with said case vertical indexing means such that said retractable shelf means avoids interference with said case when being indexed from said second to said third direction, and interferes and consequently supports said case when being indexed from said third to said fourth position.

Therefore, it is an object of the present invention to provide an improved method for handling compact disc storage cases.

It is a further object of the present invention to provide an improved apparatus for handling compact disc storage cases.

It is a further object of the present invention to provide an improved method for handling compact disc storage cases at high production rates.

It is a further object of the present invention to provide an improved apparatus for handling compact disc storage cases at high production rates.

It is a further object of the present invention to provide an improved method for handling compact disc storage cases with a minimum of damage thereto.

It is a further object of the present invention to provide an improved apparatus for handling compact disc storage cases with a minimum of damage thereto.

It is a further object of the present invention to provide an improved method and apparatus for handling compact disc storage cases which is cost-efficient in operation.

It is a further object of the present invention to provide an improved method and apparatus for handling compact disc storage cases which is cost-efficient to maintain.

It is a further object of the present invention to provide an improved method and apparatus for handling compact disc storage cases which is simple in operation.

It is a further object of the present invention to provide an improved method and apparatus for handling compact disc storage cases which is readily compatible with other manufacturing devices.

It is a further object of the present invention to provide an improved method and apparatus for handling compact disc storage cases which is reliable in operation.

It is a further object of the present invention to provide an improved method and apparatus for handling compact disc storage cases which may be operated with a minimum of operator oversight.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the figures, where like numerals designate like objects throughout the several views.

General Construction and Operation

Figure 1:
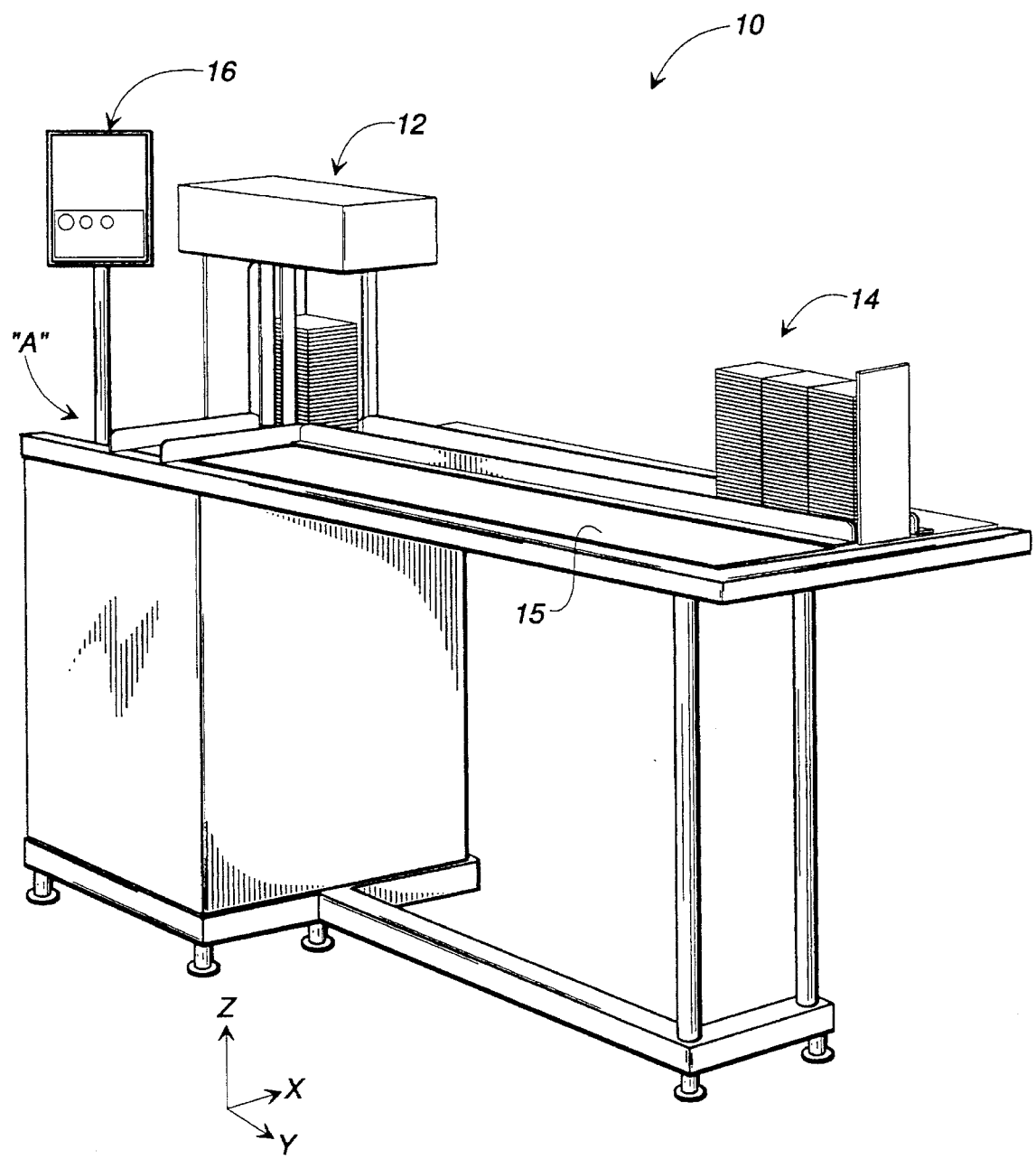
FIG. 1 is a pictorial view of a case handling apparatus 10 according to the present invention, viewing the apparatus from front, right, and side.

Referring now to FIG. 1, an apparatus 10 according to the present invention is illustrated. Cases (also referred to as products) are introduced to the apparatus 10 approximate point "A", whereupon the apparatus vertically stacks them (See also FIG. 2) at stacking station 12 until a desired stack height is obtained. Completed stacks are ejected from the stacking station 12 to be stored at a storage station 14. A control panel 16 allows for a variety of controls. The stacking apparatus 10 thus accepts cases from a conveyor and conveys them into vertical stacks which can be readily handled by an operator atop inspection surface 15.

Detailed Construction and Operation

Figure 2:
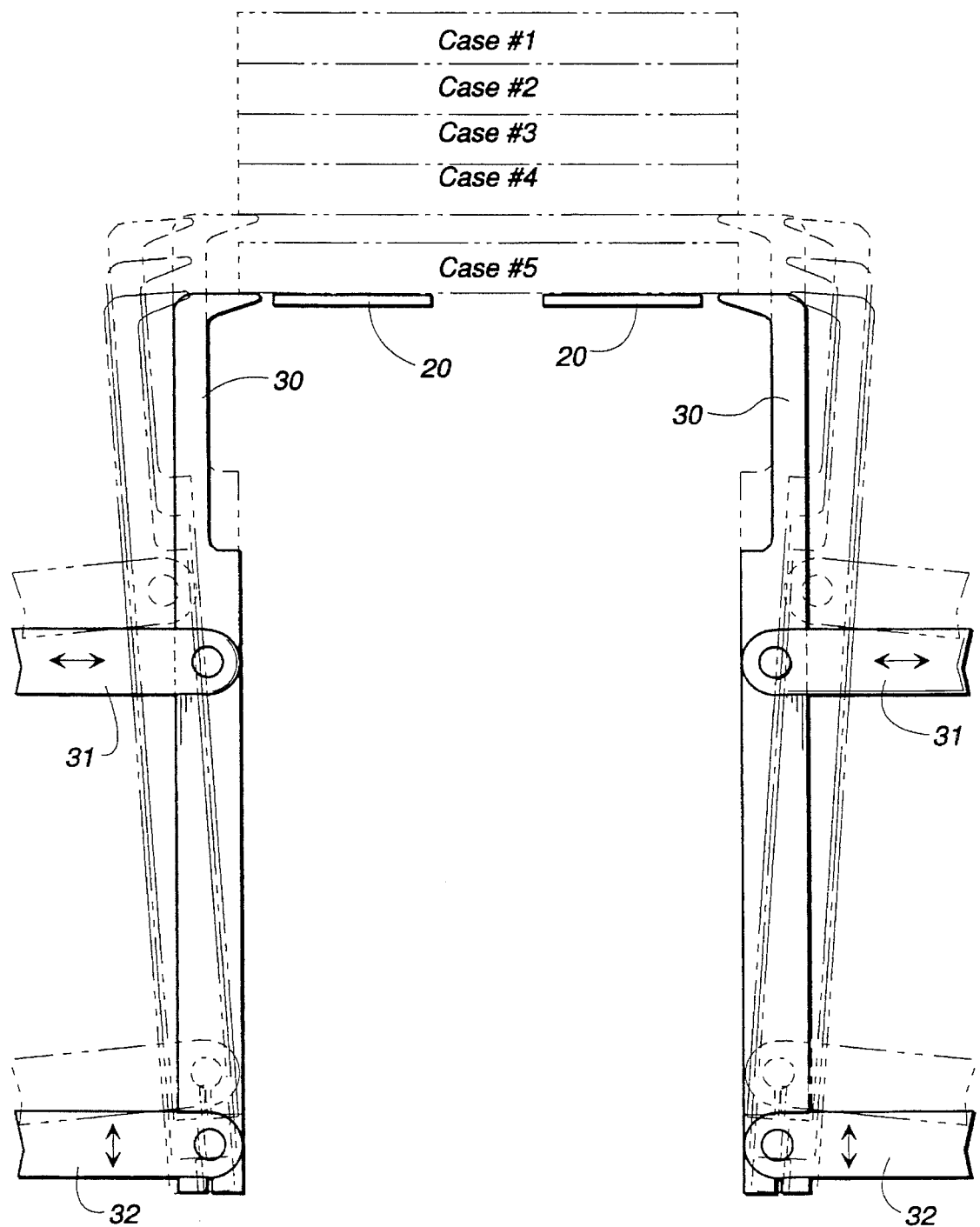
FIG. 2 is an isolated front plan view of the indexing fingers, looking "downstream" of the conveyor, with five compact disc cases #1–#5 being vertically stacked and shown in phantom.

Reference is now made to FIG. 2. As may be understood, this figure illustrates the processing of five compact disc cases, with Case #1 being processed first, and Case #2 being processed second, and Case #5 being processed last. As may be seen, the cases are thus "uploaded".

For reference purposes, it may be understood that FIG. 2 illustrates Cases #1–#4 in vertical stacked orientation, with the upper primary planar surface of Case #1 being freely exposed upwardly, and the lower primary planar surface of Case #1 being in planar contact with the upper primary planar surface of Case #2. Each case has two parallel primary planar surfaces which are substantially rectangular and approach being square.

FIG. 2 also illustrates the operation of a cooperating pair of case indexing fingers 30, which are synchronized in operation and driven by cam mechanisms (not shown), which provide the action hereinafter described. The operation of these fingers 30 is an important feature of the invention, as they allow for one case to be transferred from atop the two-part conveyor 20 (the position of Case #5 in FIG. 2) into the bottom of a stack of cases (Cases #1–#4 in FIG. 2), in a single machine cycle.

This is an important distinction from the known prior art, which can use an intermediate "dwell" position, which disadvantageously slows and complicates operation. The stacking fingers motion also allows one case to be raised as the next case moves into place in preparation for stacking.

By using a parallel linkage system, the up/down and in/out movements of the fingers 30 are controlled by the above-referenced cams, which drive upper and lower linkage pairs 31, 32, respectively. The positions of the fingers at several stages of one cycle are now described.

In position "A", the DOWN position, the tips of the fingers are located below the upper surface of the conveyor belts and are ready to raise a case into the stack above. At this point, the upper linkages 31 are fully extended and the lower linkages are fully lowered.

In position "B", the UP position, the fingers have raised the case above the level of retractable support shelves 40 (not shown in FIG. 2), which are discussed in further detail below. This is done by pivoting the lower linkages 32 upwardly.

In position "C", the OUT/UP position, the fingers have first lowered the case onto the stack support shelves 40 and have then changed direction to outwardly retract. The lowering and subsequent retraction is illustrated by the two small "right angle" arrows. The lowering is done by partial retraction of the lower linkages 32, just enough to place the case onto the upper surfaces of the stack support shelves. The subsequent outward retraction, done by fully retracting the upper linkages 31, is provided to allow them to avoid interference with the next case, which has entered the stack area and is still upon the conveyor belt 20.

In position "D", the OUT/LOWERING position, the fingers are shown passing along side the case while in the stack area. This is done by partially pivoting the lower linkages 32 down.

In position "E", the OUT/DOWN position, the fingers have reached the full down position and are ready to pivotably move back to position "A" in order to lift the next case. This is done by pivoting the lower linkages all the way down.

Figure 3:
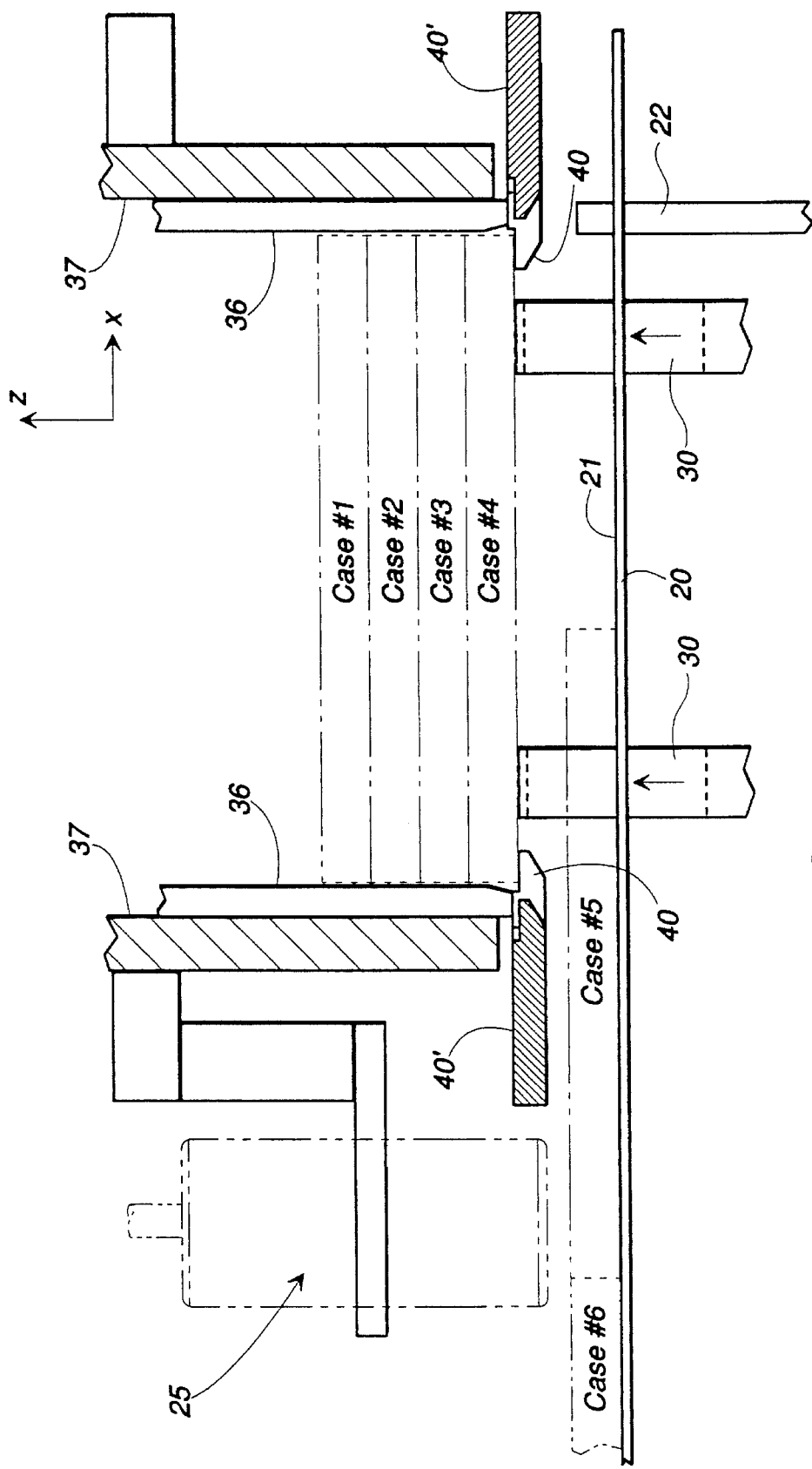
FIG. 3 is an isolated left side plan view of the apparatus of FIG. 1, illustrating the acceptance of cases in single file orientation (e.g., cases #5 and #6) and subsequent vertical stacking (e.g., cases #1 through #4).

Reference is now made to FIG. 3, in which cases are introduced left-to-right in single file, substantially horizontal orientation, and are individually stacked upwardly in a stacking area until a completed stack is discharged toward the viewer. The apparatus 10 has a flat belt conveyor system 20 defining an upwardly directed case support surface which frictionally engages the cases placed thereon and conveys the cases into the stacking area or "zone". Single units of product are released into the stacking mechanism and individually lifted into the stack. A sensor 25 is used to detect the presence of a compact disc within the case prior to entering the stack zone. A proximity sensor (such as Model#BC10, manufactured by Turk Manufacturing) is used to detect the presence of a compact disc within the case when the case is stopped in the escapement mechanism prior to stacking.

As may be seen, vertical stack guide rails 36 provide upper guidance for the stack as it is being created The retractable stacking shelves cooperate with the stack indexing fingers 30 in order to obtain scratch free handling of the jewel cases. The stacking shelves 40 have two positions, a supporting position shown as 40 in FIG. 3, and a retracted position shown as 40' in FIG. 3.

Figure 4:
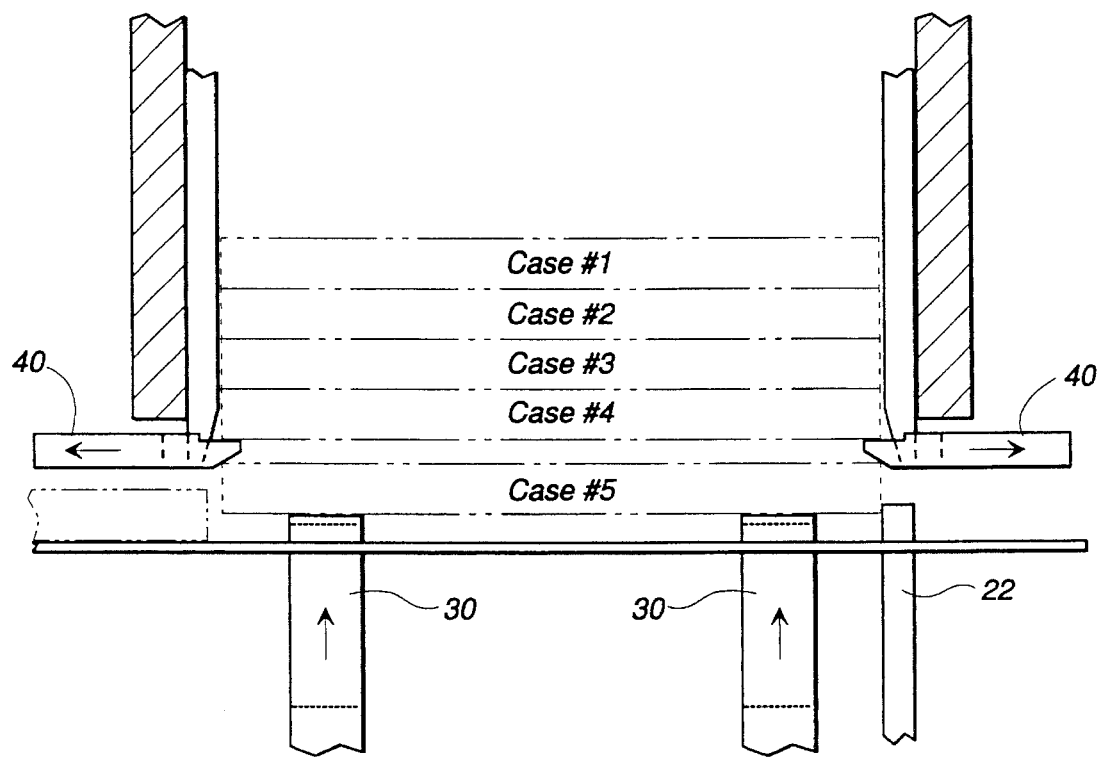
FIGS. 4–7 are views such as FIG. 3, illustrating further processing of cases #1–#6.
Figure 5:
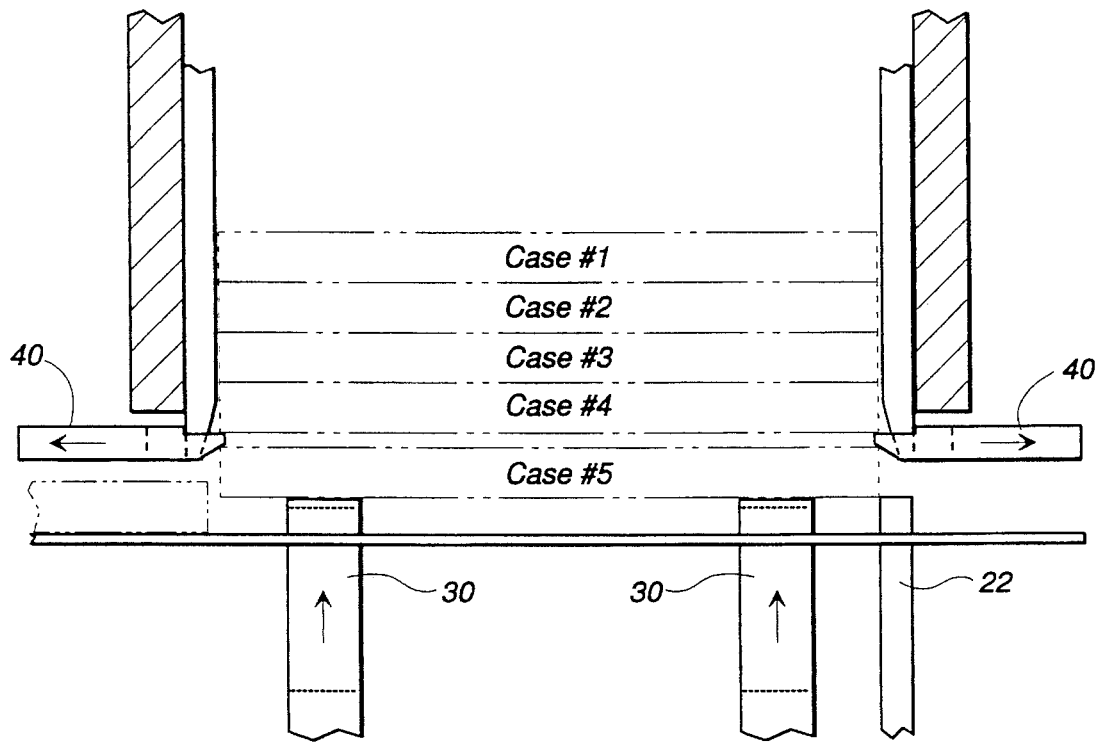
Figure 6:
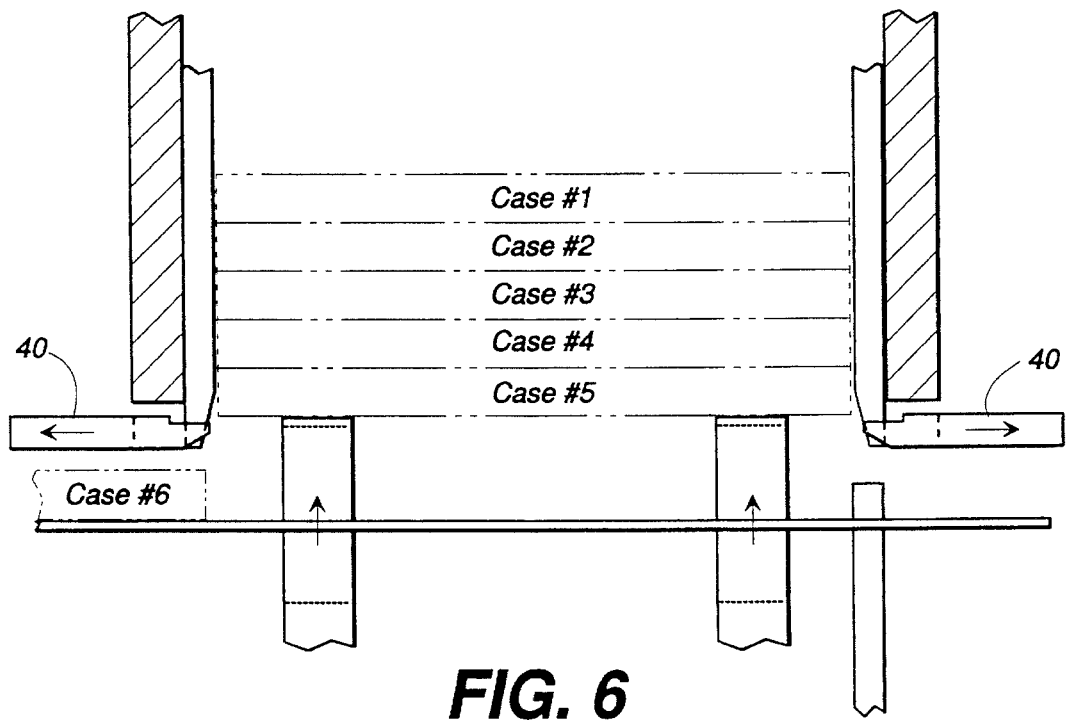
Figure 7:
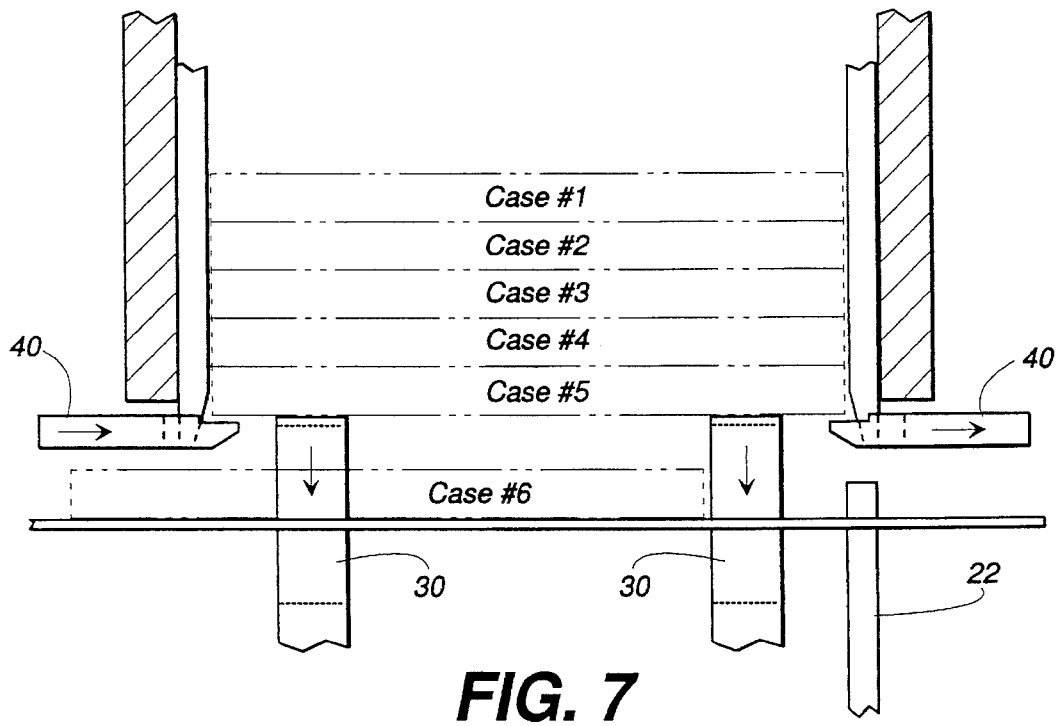

As shown in FIGS. 4 and 5, when the indexing fingers begin to rise to their UP position, the stacking fingers begin to retract. The cam system is designed to assure that the case being elevated is in very close proximity to the bottommost case in the stack (Case #4 in FIGS. 4 and 5) before the stack support fingers are fully retracted as shown in FIG. 6. In other words, the fingers 40 move outwardly just enough to get out of the way of the case being elevated, with the case stack dropping onto the case being elevated at the last second. This arrangement causes very little drop from the position in FIG. 5 to FIG. 6, as the stack of cases is released onto Case #5 which is being elevated. It may be understood that the support shelves are pivotably mounted to allow upward pivoting should the shelves interfere with a case being raised.

The case stop finger 22 can be retracted to allow release of packages to provide throughput if so desired.

Figure 9:
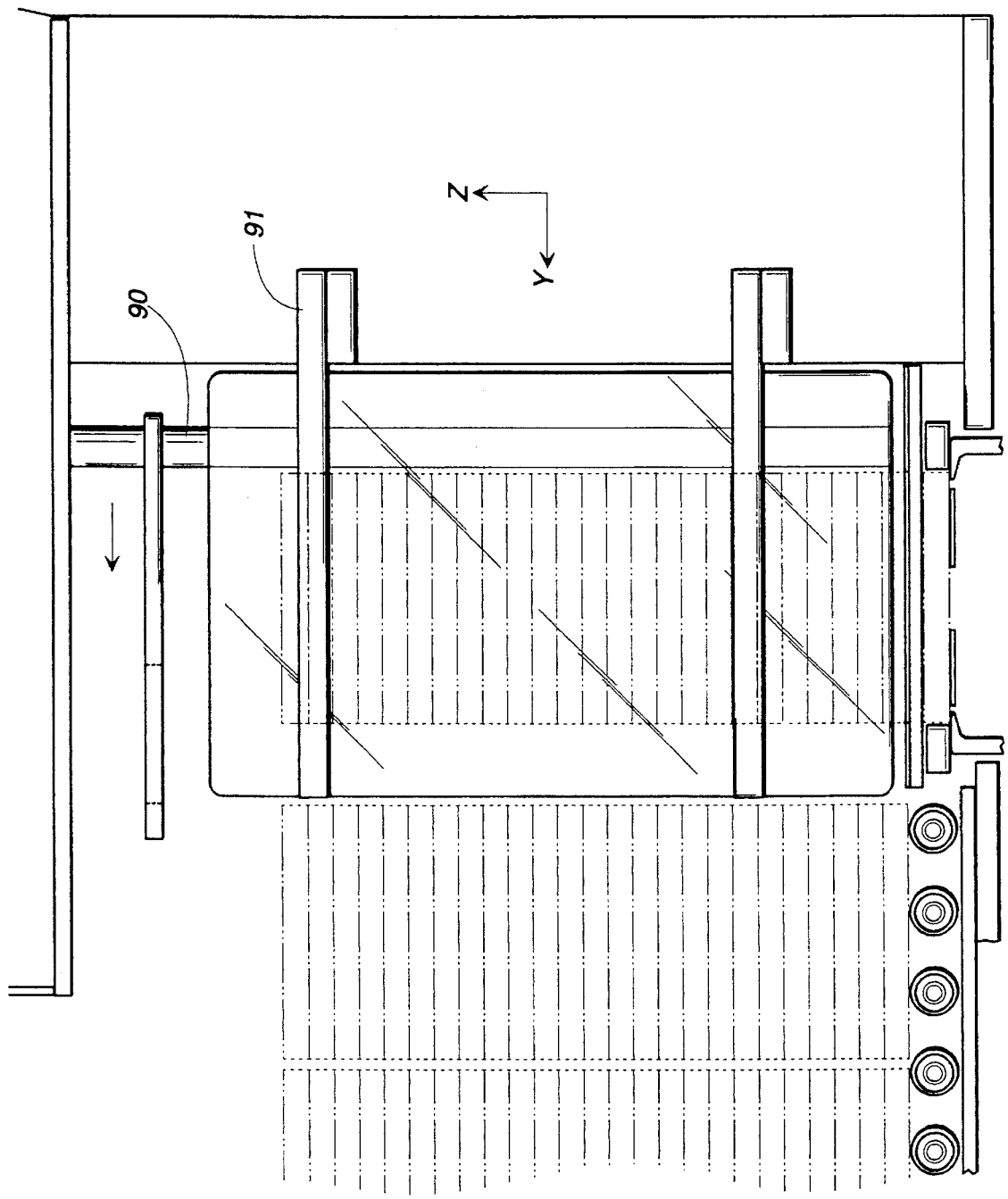
FIG. 9 is a side elevational view of the stacking portion of the apparatus 10, as the individual cases are conveyed toward the viewer, indexed upwardly, and transferred in a stack to the viewer's left.

Referring now to FIG. 9, this is a side elevational view of a completed stack as it is discharged from the stacking area. The vertical stack transfer rods, which are driven through a safety detent link, push complete stacks onto a set of discharge rollers in order that the operator may inspect them and place them in shipping cartons. Lexan or other suitable guards which enclose the stack area are mounted on hinge bars in order to facilitate easy clean out of the area.

Top Plan View

Figure 8:
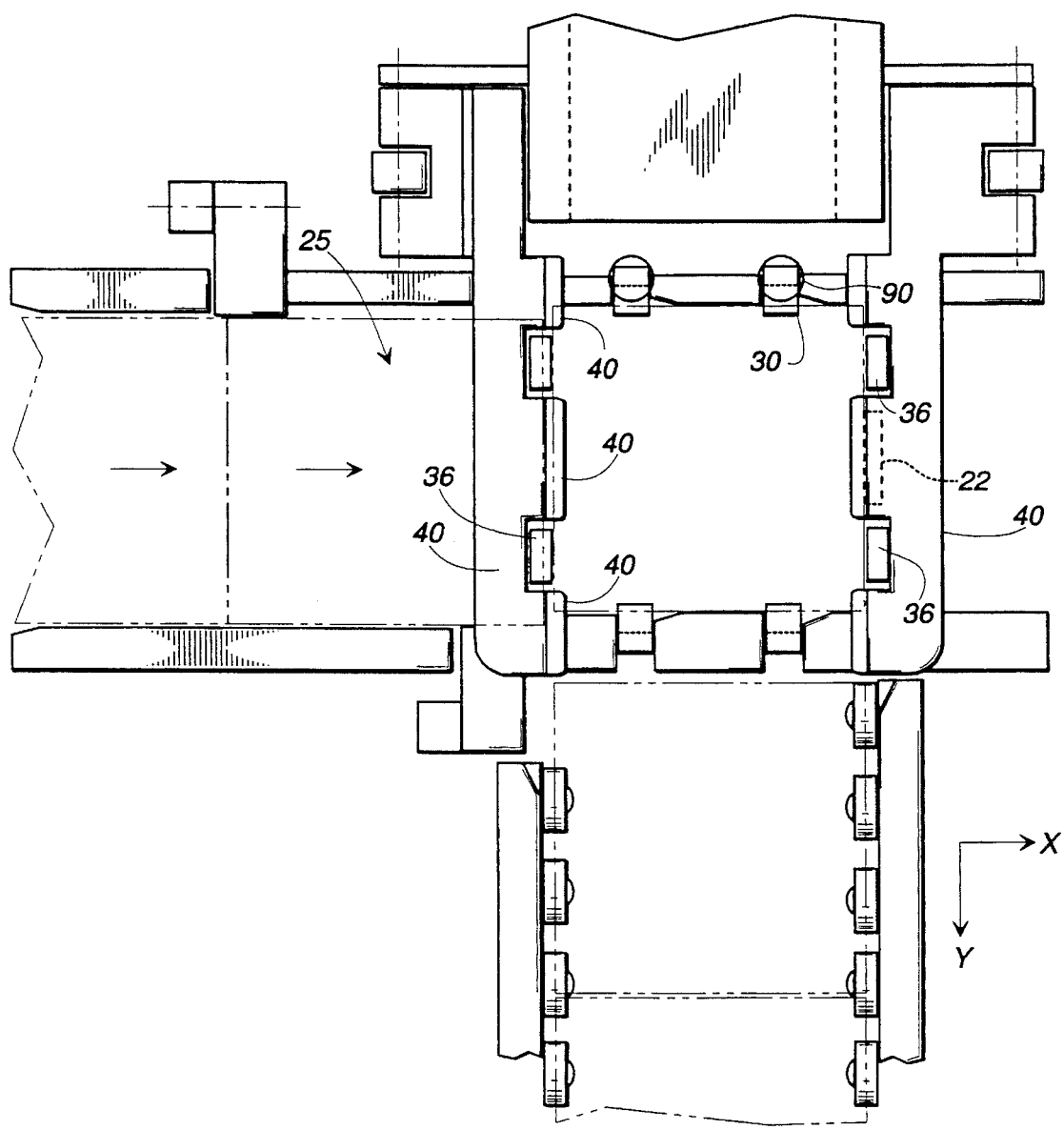
FIG. 8 is a top plan view of the stacking station portion of the apparatus 10, with the cases entering the apparatus from the viewer's left, being stacked toward the viewer, and the stacks being discharged downwardly onto the roller conveyor.

Referring now to FIG. 8, this is a top view which shows the basic escapement method along with the layout of the stack support fingers 30 and discharge system. Escapement fingers are used to move a case unit to the side in order to pass the case escapement stop block. This is done at a timed interval in order to coincide with the position of the previous case. The stacking fingers are four in total and work in pairs. The discharge rollers are free wheeling: thus the stacks only move by the pushing motion of the attack transfer rods.

The stacks are pushed out of the stacking area by a safety detented mechanical transfer mechanism.

Storage

Referring now to FIG. 1, the storage station 14, also referred to as stack discharge lane 14, is an effectively idling roller conveyor as known in the art. A stainless steel work area is provided on the discharge area to allow an operator to conduct inspection of the stacks prior to placement of the stacks in a shipping box or another cart if further processing is required.

Variations

Stacks of 15, 25, 30 or other numbers of units may be selected depending on the requirements of the particular application.

Control; Power Transfer

Simple and easy to operate controls complement the solid mechanical design of the apparatus. A Programmable Logic Controller (PLC) such as Model SLC 500 manufactured by Allen-Bradley Corp., provides flexibility in integrating this apparatus into a modular approach of handling CD products.

The apparatus includes a main drive motor which drives a main shaft. At least three timing belts may be used to drive the infeed conveyor, the stack transfer mechanism, and the remaining elements.

The controls provided by the control panel may include start, stop, emergency stop, fault reset, manual stack, and manual transfer.

Integration with Other Apparatuses

In one preferred embodiment, the PLC is programmed to facilitate stacking of acceptable units, and unacceptable units are rejected out the back of the machine simply by retracting the case stop finger 22. An alternate would be to stack unacceptable rejects and to allow acceptable product to pass out of the apparatus in single file, horizontally oriented, substantially horizontal orientation similar to how they entered the system.

A supply sensor (not shown) is used to allow the apparatus to go into a HOLD mode if is incoming product is not present, thereby reducing the wear on the product as well as the machine components.

Directional Terms

For purposes of this discussion, the apparatus 10 is considered to have a "front", "rear", "left" and "right" sides, and is in relation to three mutually perpendicular axes, comprising axis "X", "Y", and "Z" (See FIG. 1). The cases initially travel in the "X" direction, then in the "Z" direction, and finally within a stack in the "Y" direction.

Conclusion

Therefore it may be seen that the present invention provides an improvement over the prior art by providing an improved stacker. It should be understood that although much of the discussion herein relates to stacking CD cases, it should be understood that the present invention may also related to other planar items having particular handling features.

While this invention has been described in specific detail with reference to the disclosed embodiments, it will be understood that many variations and modifications may be effected within the spirit and scope of the invention as described in the appended claims.

What is claimed is:

1. An apparatus for stacking substantially flat compact disc cases each including substantially parallel upper and lower major planar surfaces, a substantially uniform thickness and a periphery, said apparatus comprising:

conveyor means defining a supporting surface for transferring cases placed thereon in a first direction from a first position to a second position, said lower surfaces of said cases in said first and second positions being substantially coplanar;

case vertical indexing means for moving said cases from said second position to a third position in a second direction, said second direction being substantially perpendicular to said first direction, and subsequently from said third position to a fourth position in a third direction, said third direction being substantially opposite to said second direction, retractable shelf means being movable from a retracted position to a case supporting position, the operation of said retractable shelf means being synchronized with the operation of said case vertical indexing means such that said retractable shelf means avoids interference with said case when said case is indexed from said second to said third position, and interferes with and consequently supports said case when said case is indexed from said third to said fourth position; and means for synchronizing the movement of said retractable shelf means to cause a first-in-time case to be released and drop from said fourth position atop a second-in-time case when said second-in-time case is being indexed from said second to said third position, said first-in-time case and said second-in-time case thus creating a vertical stack of cases.

2. The apparatus as claimed in claim 1, wherein said case vertical indexing means comprises at least two retractable fingers.

3. The apparatus as claimed in claim 1, wherein said retractable shelf means comprises at least two retractable opposing shelf members configured to move outwardly to allow said drop to occur.

4. The apparatus as claimed in claim 2, wherein said retractable shelf means comprises at least two retractable opposing shelf members configured to move outwardly to allow said drop to occur.

5. A method for stacking substantially flat compact disc cases each including substantially parallel upper and lower major planar surfaces, a substantially uniform thickness and a periphery, said method comprising:

transferring cases in a first direction from a first position to a second position, said lower surfaces of said cases in said first and second positions being substantially coplanar;

indexing said cases from said second position to a third position in a second direction, said second direction being substantially perpendicular to said first direction, and subsequently from said third position to a fourth position in a third direction, said third direction being substantially opposite to said second direction; and selectively moving a retractable shelf means from a retracted position to a case supporting position, said retractable shelf movement being synchronized with said indexing step such that said retractable shelf means avoids interference with said case when said case is indexed from said second to said third position, interferes with and consequently supports said case when said case is indexed from said third to said fourth position, and releases and drops a first-in-time case atop a second-in-time case when said second-in-time case is being indexed from said second to said third position, said first-in-time case and said second-in-time case thus creating a vertical stack of cases.

6. An apparatus for stacking substantially flat compact disc cases each including substantially parallel upper and lower major planar surfaces, a substantially uniform thickness and a periphery, said apparatus comprising:

pass-through conveyor means defining a supporting surface for transferring cases placed thereon in a first direction from a first position to a second position to a throughput position, said lower surfaces of said cases in said first, and second, and throughput positions being substantially coplanar, said throughput position allowing for removal of said disc cases from said apparatus without further processing;

case vertical indexing means for moving said cases from said second position to a third position in a second direction, said second direction being substantially perpendicular to said first direction, and subsequently from said third position to a fourth position in a third direction, said third direction being substantially opposite to said second direction; and retractable shelf means being movable from a retracted position to a case supporting position, said retractable shelf means movement being synchronized with said movement of said case vertical indexing means such that said retractable shelf means avoids interference with said case when said case is indexed from said second position to said third position, and interferes with and consequently supports said case when said case is indexed from said third to said fourth position and releases and drops a first-in-time case atop a second-in-time case when said second-in-time case is being indexed from said second position to said third position, said first-in-time case and said second-in-time case thus creating a vertical stack of cases.

7. The apparatus as claimed in claim 6, wherein said case vertical indexing means comprises at least two retractable fingers.

8. The apparatus as claimed in claim 7, wherein said retractable shelf means comprises at least two retractable opposing shelf members.

9. The apparatus as claimed in claim 6, wherein said retractable shelf means comprises at least two retractable opposing shelf members.

\* \* \* \* \*